US012701204B2

(12) United States Patent　(10) Patent No.:　US 12,701,204 B2
Li et al.　(45) Date of Patent:　Aug. 4, 2026

(54) PICTURE GENERATION APPARATUS, PROJECTION APPARATUS, AND VEHICLE

(71) Applicant: Yinwang Intelligent Technologies Co., Ltd., Shenzhen (CN)

(72) Inventors: Shimao Li, Shenzhen (CN); Yunfei Yan, Dongguan (CN); Yuchen Chen, Dongguan (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 231 days.

(21) Appl. No.: 18/503,405

(22) Filed: Nov. 7, 2023

(65) Prior Publication Data

US 2024/0073379 A1　Feb. 29, 2024

Related U.S. Application Data

(63) Continuation of application No. PCT/CN2022/089273, filed on Apr. 26, 2022.

(30) Foreign Application Priority Data

May 8, 2021　(CN) .......................... 202110514415.0

(51) Int. Cl.
*H04N 9/31*　(2006.01)
(52) U.S. Cl.
CPC ......... *H04N 9/3152* (2013.01); *H04N 9/3117* (2013.01); *H04N 9/3158* (2013.01); *H04N 9/3167* (2013.01); *H04N 9/3194* (2013.01)

(58) Field of Classification Search
CPC .. G03B 21/005; G03B 21/006; G03B 21/008; G03B 21/20; G03B 21/28; G03B 21/145; G03B 21/147; G03B 21/2033; G03B 21/2053; H04N 9/3111; H04N 9/3117; H04N 9/3152; H04N 9/3155; H04N 9/3158; H04N 9/3167; H04N 9/3194;
(Continued)

(56) References Cited

U.S. PATENT DOCUMENTS

2005/0190345 A1*　9/2005　Dubin ................ G03B 21/2053
353/20
2011/0181801 A1　7/2011　Okumura
(Continued)

FOREIGN PATENT DOCUMENTS

CN　101546045 A　9/2009
CN　102298253 A　12/2011
(Continued)

*Primary Examiner* — Sultan Chowdhury
(74) *Attorney, Agent, or Firm* — Leydig, Voit & Mayer, Ltd.

(57) ABSTRACT

A picture generation apparatus includes at least a light source assembly, a spatial light modulation assembly, a beam adjustment assembly and a lens assembly. The light source assembly is configured to generate a first beam. The spatial light modulation assembly is configured to modulate the first beam to generate a picture beam. The lens assembly is configured to project the picture beam onto a projection surface to display a target picture. The beam adjustment assembly is disposed in the lens assembly or on an optical path between the light source assembly and the spatial light modulation assembly, and is configured to adjust a light amount of the first beam, to adjust brightness of the target picture.

20 Claims, 6 Drawing Sheets

(58) Field of Classification Search
CPC ........ G02B 27/01; G02B 27/09; G02B 27/28;
G02B 27/283; G02B 27/286
See application file for complete search history.

(56) References Cited

U.S. PATENT DOCUMENTS

| | | | | |
|---|---|---|---|---|
| 2016/0266391 A1* | 9/2016 | Han | .................... | G09G 3/001 |
| 2019/0049832 A1* | 2/2019 | Maeda | ................. | G03B 21/006 |
| 2019/0324357 A1* | 10/2019 | Chen | .................... | G03B 21/208 |
| 2020/0177855 A1* | 6/2020 | Miao | ................... | H04N 9/3185 |
| 2021/0191319 A1* | 6/2021 | Christmas | ............ | G03H 1/2205 |
| 2022/0256130 A1* | 8/2022 | Lang | ................... | H04N 9/3155 |

FOREIGN PATENT DOCUMENTS

| | | | |
|---|---|---|---|
| CN | 103838069 A | 6/2014 |
| CN | 107076991 A | 8/2017 |
| CN | 108322719 A | 7/2018 |
| CN | 109507843 A | 3/2019 |
| CN | 112099230 A | 12/2020 |
| WO | 2020200217 A1 | 10/2020 |

* cited by examiner

PICTURE GENERATION APPARATUS, PROJECTION APPARATUS, AND VEHICLE

CROSS-REFERENCE TO RELATED APPLICATIONS

This application is a continuation of International Application No. PCT/CN2022/089273, filed on Apr. 26, 2022, which claims priority to Chinese Patent Application No. 202110514415.0, filed on May 8, 2021. The disclosures of the aforementioned applications are hereby incorporated by reference in their entireties.

TECHNICAL FIELD

This application relates to the field of projection display technologies, and in particular, to a picture generation apparatus, a projection apparatus, and a vehicle.

BACKGROUND

Head-up display (HUD), also known as a head-up display system, is an apparatus that projects information such as a speed and navigation to the front of a driver, and enables the driver to see instrument information without having to look down. Initially, the HUD is a technology used in aircrafts, such as HUD-based object tracking and targeting by fighter pilots, which can improve an operation success rate and flexibility. Later, the technology is applied to cars. A driver can see information such as a car speed, navigation, and signal lights in a front field of view without a need to look down at a dashboard or central display screen under a steering wheel, and this can greatly improve braking response time in emergencies and improve driving safety. A principle of the HUD is that a picture generation unit (PGU) generates a picture based on information such as navigation information and instrument information, and then the picture is projected onto a windshield to form a real image, or a magnified virtual image observable by human eyes is formed in front of the car through a curved reflector and the windshield, and is used as a driving reference for the driver.

When the HUD is turned on during the day and at night, environment brightness varies greatly. Therefore, adjustable display brightness of the HUD based on the environment brightness is needed. The maximum brightness of the HUD is designed based on the daytime environment. Generally, the brightness needs to be 10000 nits or higher. At night, the environment brightness is reduced. When the human eyes adapt to a dark environment, the brightness becomes dazzling and road conditions cannot be seen clearly, affecting driving safety. Therefore, the brightness needs to be reduced. In some cases, the brightness needs to be reduced to 100 nits or lower. Currently, a general method of adjusting the HUD brightness is to adjust the current to reduce brightness of a PGU back light source, thereby reducing brightness of a projected virtual image. However, in this solution, a drive circuit needs to be specially designed, and a drive design that supports stably adjusting the current in a large range is complex. This increases costs of the HUD to a specific extent.

SUMMARY

To overcome the foregoing problem, embodiments of this application provide a picture generation apparatus, a projection apparatus, and a vehicle, to dynamically adjust brightness of a picture generated by the picture generation apparatus, without a need to specially design a drive circuit of a light source assembly.

To achieve the foregoing objective, according to a first aspect, this application provides a picture generation apparatus, including at least a light source assembly, a spatial light modulation assembly, a beam adjustment assembly, and a lens assembly. The light source assembly is configured to generate a first beam. The spatial light modulation assembly is configured to modulate the first beam to generate a picture beam. The lens assembly is configured to project the picture beam onto a projection surface to display a target picture. The beam adjustment assembly is disposed in the lens assembly or on an optical path between the light source assembly and the spatial light modulation assembly, and is configured to adjust a light amount of the first beam, to adjust brightness of the target picture. Thus, brightness of a picture generated by the picture generation apparatus can be dynamic adjusted without a need to specially design a drive circuit of the light source assembly.

In a possible implementation, the beam adjustment assembly includes a control element and an adjustable aperture stop element, and the control element controls a size of a light transmission hole of the adjustable aperture stop element to adjust the light amount of the first beam. It is further implemented that contrast of the picture is adjusted while the brightness of the picture is adjusted.

Optionally, the light transmission hole of the adjustable aperture stop element is a circular light transmission hole or a rectangular light transmission hole.

In another possible implementation, the picture generation apparatus further includes a light homogenizing assembly, the light homogenizing assembly is disposed on the optical path between the light source assembly and the spatial modulation assembly, and is configured to perform light homogenization on the first beam generated by the light source assembly. The beam adjustment assembly is disposed on an optical path between the light source assembly and the light homogenizing assembly, or the beam adjustment assembly is disposed on an optical path between the light homogenizing assembly and the spatial light modulation assembly.

Optionally, the light homogenizing assembly is a compound eyes lens.

In another possible implementation, the spatial light modulation assembly is a reflective spatial light modulation assembly.

In another possible implementation, the reflective spatial light modulation assembly is an LCoS assembly, and the picture generation apparatus further includes a polarization beamsplitter element. The polarization beamsplitter element is disposed on an optical path between the light source assembly and the LCoS assembly, and is configured to reflect a beam of S-polarized light to the LCoS assembly, and transmit a beam of P-polarized light to the lens assembly.

In another possible implementation, the picture generation apparatus further includes a polarized light conversion element. The polarized light conversion element is disposed on an optical path between the light source assembly and the polarization beamsplitter element, and is configured to modulate the first beam into the beam of the S-polarized light.

In another possible implementation, the LCoS assembly includes a rectangular LCoS panel. An extension direction of a short side of the rectangular LCoS panel is parallel to an incident surface, and the incident surface is a plane determined by an incident beam and a reflected beam of the polarization beamsplitter element.

In another possible implementation, the reflective spatial light modulation assembly is a DMD assembly, and the picture generation apparatus further includes a first collimation lens element and a reflector element. The first collimation lens element is disposed on an optical path between the light source assembly and the DMD assembly, and is configured to collimate the first beam. The reflector element is disposed on an optical path between the first collimation lens element and the DMD assembly, and is configured to reflect, to the DMD assembly, a beam collimated by the first collimation lens element.

In another possible implementation, the light source assembly includes at least: a red light LED element, configured to generate a red beam; a green light LED element, configured to generate a green beam; a first blue light LED element, configured to generate a first blue beam; a second blue light LED element, disposed opposite to the first blue light LED element to generate a second blue beam; a first dichroic mirror element, disposed on transmission paths of the green beam, the first blue beam, and the second blue beam, and configured to reflect the first blue beam to the green light LED element, and transmit the green beam and reflect the second blue beam onto the transmission path of the green beam to form a mixed beam; and a second dichroic mirror element, disposed on transmission paths of the red beam and the mixed beam, and configured to transmit the mixed beam and reflect the red beam to form the first beam on the transmission path of the mixed beam.

In another possible implementation, the light source assembly further includes a second collimation lens element. The second collimation lens element is disposed on the transmission path of the mixed beam, and is configured to collimate the mixed beam to the second dichroic mirror element.

According to a second aspect, this application further provides a projection apparatus. The projection apparatus includes the picture generation apparatus in the first aspect and an ambient brightness sensor. The ambient brightness sensor is configured to detect brightness of an environment in which the projection surface is located. The picture generation apparatus is in communication connection with the ambient brightness sensor, to adjust the brightness of the target picture based on the brightness of the environment in which the projection surface is located.

According to the projection apparatus provided in this application, brightness of a projected picture can be automatically adjusted based on environment brightness, to improve user experience.

In a possible implementation, the ambient brightness sensor is in communication connection with a control element. The control element controls the size of the light transmission hole of the adjustable aperture stop element based on the brightness of the environment in which the projection surface is located, to adjust the brightness of the target picture.

According to the projection apparatus provided in this application, the brightness of the projected picture is automatically adjusted based on the environment brightness, and contrast of the projected picture is also adjusted, so that the brightness of the projected picture is automatically reduced in a dark environment, and the contrast of the projected picture is also increased.

According to a third aspect, an embodiment of this application further provides a vehicle. The vehicle includes the picture generation apparatus in the first aspect or the projection apparatus in the second aspect.

BRIEF DESCRIPTION OF THE DRAWINGS

The following briefly describes the accompanying drawings that need to be used for describing embodiments.

DETAILED DESCRIPTION OF ILLUSTRATIVE EMBODIMENTS

The following describes the technical solutions in embodiments of this application with reference to the accompanying drawings in the embodiments of this application.

In the descriptions of this application, directions or position relationships indicated by the terms "center", "up", "down", "front", "rear", "left", "right", "vertical", "horizontal", "top", "bottom", "inside", "outside", and the like are based on the directions or position relationships shown in the accompanying drawings, and are merely intended to describe this application for the convenience and simplify the descriptions, but are not intended to indicate or imply that an apparatus or element shall have a specific direction or be constructed and operated in a specific direction, and therefore shall not be understood as a limitation on this application.

In the descriptions of this application, it should be noted that: Unless otherwise specified and limited, the terms "installation", "interconnection" and "connection" shall be understood in a generic sense, for example, may be a fixed connection, a detachable connection, a pressing connection or an integrated connection. For a person of ordinary skill in the art, specific meanings of the foregoing terms in this application may be understood based on a specific situation.

Figure 1:
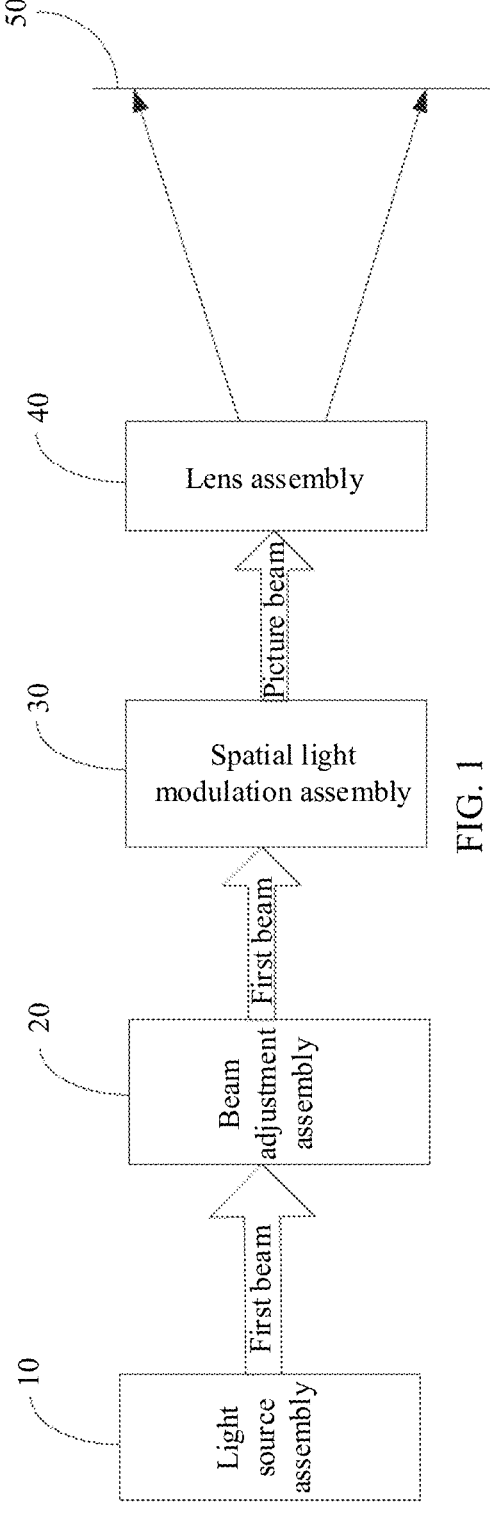
FIG. 1 is a schematic diagram of a structure of a picture generation apparatus according to an embodiment of this application.

FIG. 1 is a schematic diagram of a structure of a picture generation apparatus according to an embodiment of this application. As shown in FIG. 1, the picture generation apparatus includes at least a light source assembly 10, a beam adjustment assembly 20, a spatial light modulation assembly 30, and a lens assembly 40. The light source assembly 10 generates a first beam. The spatial light modulation assembly 30 is disposed on a transmission path of a first beam, and modulates the first beam to generate a picture beam. The lens assembly 40 is disposed on a transmission path of the picture beam, and projects the picture beam onto a projection surface 50 to display a target picture. The beam adjustment assembly 20 is disposed on an optical path between the light source assembly 10 and the spatial light modulation assembly 30, and is configured to adjust a light amount of the first beam, to adjust brightness of the target picture.

According to the picture generation apparatus in this embodiment of this application, brightness of a picture generated by the picture generation apparatus is dynamically adjusted by using an optical design, to avoid a problem of excessively high costs that is caused by a complex drive circuit needed in a conventional solution.

It is easy to understand that a projection surface mentioned in this embodiment of this application is a surface on which a projected picture (that is, a target picture) is displayed. For example, when the projected picture is a real image, the projection surface may be a surface of a physical entity, for example, a surface of a physical entity such as a screen surface, a wall surface, a projection screen surface, and a front windshield surface of a vehicle. When the projected picture is a virtual image, the projection surface is a surface on which the projected picture is displayed, for example, a surface with a preset distance in front of a front windshield of the vehicle.

In an example, the beam adjustment assembly may be alternatively disposed in the lens assembly, and brightness of the projected picture is adjusted by adjusting an amount of emitted light of the picture beam. For example, the beam adjustment assembly may be disposed at an original aperture deployment position of the lens assembly, in other words, an aperture in the lens assembly is replaced with the beam adjustment assembly, so that the amount of the emitted light of the picture beam is adjusted by using the beam adjustment assembly without affecting display of projected picture content, and in this way, the brightness of the projected picture is adjusted.

The beam adjustment assembly in this embodiment of this application is intended to dynamically adjust the light amount of the first beam. Therefore, only an optical element that can achieve this purpose is needed. For example, the beam adjustment assembly in this embodiment of this application includes but is not limited to an optical element that can adjust a light amount of a beam, such as an aperture stop or a liquid crystal element.

For example, the beam adjustment assembly includes a control element and an adjustable aperture stop element, an aperture size of a light transmission hole of the adjustable aperture stop element is adjustable, and the control element adjusts a light amount of the first beam passing through by controlling the size of the light transmission hole of the adjustable aperture stop element. For example, the control element may drive, by controlling a driving member, the light transmission hole of the adjustable aperture stop element to become larger or smaller, to automatically adjust the light amount of the first beam.

Figure 2A:
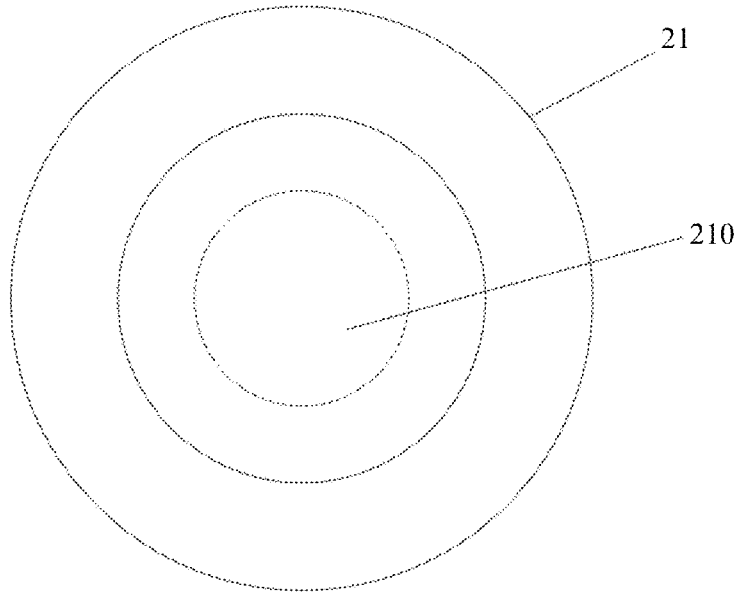
FIG. 2a shows a view of an adjustable aperture stop element in a beam transmission direction.
Figure 2B:
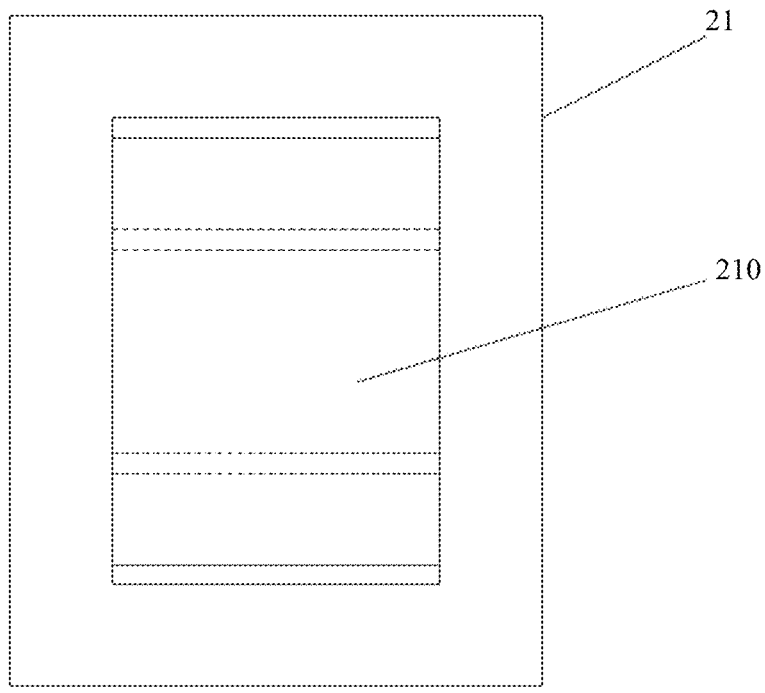
FIG. 2b shows a view of another adjustable aperture stop element in a beam transmission direction.

It should be noted that this embodiment of this application does not limit a shape of the light transmission hole of the adjustable aperture stop element. The light transmission hole with a proper shape may be selected based on a requirement. For example, the light transmission hole of the adjustable aperture stop element may be a circular light transmission hole or a rectangular light transmission hole. For example, FIG. 2a shows a view of an adjustable aperture stop element in a beam transmission direction. As shown in FIG. 2a, a light transmission hole 210 of an adjustable aperture stop element 21 is circular, a light amount of a first beam can be limited in both transverse and longitudinal dimensions by adjusting a size of a radius of the circular light transmission hole, to adjust brightness and contrast of a projected picture. FIG. 2b shows another view of an adjustable aperture stop element in a beam transmission direction. As shown in FIG. 2b, a light transmission hole 210 of the adjustable aperture stop element 21 is rectangular, and may be designed to enable a size of the light transmission hole to be adjustable in both transverse and longitudinal dimensions, or may be designed to enable the size of the light transmission hole to be adjustable only in the longitudinal dimension. For example, as shown in FIG. 2b, the light transmission hole 210 of the adjustable aperture stop element 21 is designed to enable the size of the light transmission hole 210 to be adjustable only in the longitudinal dimension. In this way, a light amount of a first beam is limited only in the longitudinal dimension, so that a projected picture achieves higher contrast under same brightness.

It is easy to understand that meanings of the transverse dimension and the longitudinal dimension mentioned above are mutually perpendicular directions of a plane in which the light transmission hole of the adjustable aperture stop element is located. For example, a direction perpendicular to the ground is the longitudinal dimension, and a direction parallel to the ground is the transverse dimension.

It should be noted that, an area defined by an inner solid line of the adjustable aperture stop element shown in FIG. 2a and an area defined by an inner solid line of the adjustable aperture element shown in FIG. 2b represent a size of the light transmission hole before/after adjustment, and an area defined by a dashed line shown in FIG. 2a and an area defined by dashed lines shown in FIG. 2b represent a size of the light transmission hole after/before adjustment.

Figure 3:
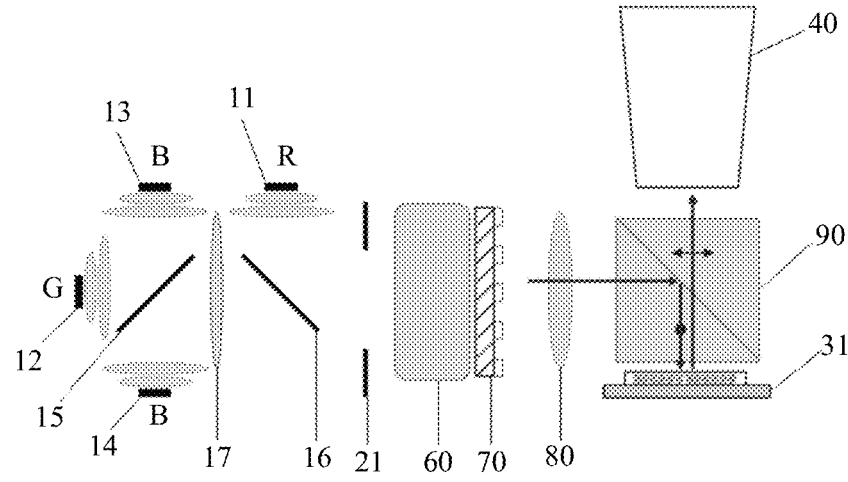
FIG. 3 is a schematic diagram of a structure of another picture generation apparatus according to an embodiment of this application.

FIG. 3 is a schematic diagram of a structure of another picture generation apparatus according to an embodiment of this application. As shown in FIG. 3, the picture generation apparatus further includes a light homogenizing assembly 60, which is disposed on an optical path between a light source assembly including at least one light emitting element (for example, an LED 11, an LED 12, an LED 13, and an LED 14) and a spatial modulation assembly 30, and is configured to perform light homogenization on a first beam generated by the light source assembly 10.

The light homogenizing assembly 60 refers to an optical element that homogenizes a beam passing through the light homogenizing assembly 60. For example, the light homogenizing element may be a compound eyes lens or an integral column. In another example, the light homogenizing assembly may alternatively be a lens array or another optical element having a light homogenization effect. This is not limited in this embodiment of this application.

The beam adjustment assembly may be disposed on an optical path between the light source assembly and the light homogenizing assembly. For example, as shown in FIG. 3, an adjustable aperture stop 21 is disposed on an optical path between the light source assembly and the light homogenizing assembly 60. Alternatively, the beam adjustment assembly may be disposed on an optical path between the light homogenizing assembly and a spatial light modulation assembly 30.

The spatial light modulation assembly 30 may be a transmissive spatial light modulator, for example, a liquid crystal display (LCD) assembly, or a reflective spatial light modulator, for example, a liquid crystal on silicon (LCoS) assembly or a digital micromirror display (DMD) assembly.

When the spatial light modulation assembly 30 is the LCoS assembly, the picture generation apparatus further includes a polarization beamsplitter element, and the polarization beamsplitter element is disposed on an optical path between the light source assembly and the LCoS assembly, and is configured to reflect a beam of S-polarized light to the LCoS assembly and transmit a beam of P-polarized light to the lens assembly.

For example, as shown in FIG. 3, a polarization beamsplitter element 90 is disposed on an optical path between the light source assembly and an LCoS panel 31, and is configured to reflect the beam of the S-polarized light to the LCoS panel 31, and transmit the beam of the P-polarized light to the lens assembly 40.

The polarization beamsplitter element 90 may be a polarization beamsplitter prism shown in FIG. 3, or may be a polarization beamsplitter plate, or another polarization beamsplitter optical element that can reflect S-polarized light and transmit P-polarized light. This is not limited in this application.

To further improve contrast of a projected picture, the picture generation apparatus is further disposed with a polarization conversion system (PCS), configured to modulate a polarization state of a first beam into an S polarization state.

For example, as shown in FIG. 3, the polarization conversion element 70 is disposed on an optical path between the light homogenizing element 60 and the polarization beamsplitter element 90, and modulates the polarization state of the first beam into S-polarized light, so that more S-polarized light is incident onto the LCoS panel, to increase the contrast of the projected picture.

According to the picture generation apparatus provided in this embodiment of this application, the adjustable aperture stop is disposed, a light amount of the first beam is adjusted, the brightness of the projected picture is further adjusted, and the contrast of the projected picture may be further adjusted, achieving low brightness and high contrast of the projected picture in a dark light environment.

Figure 4A:
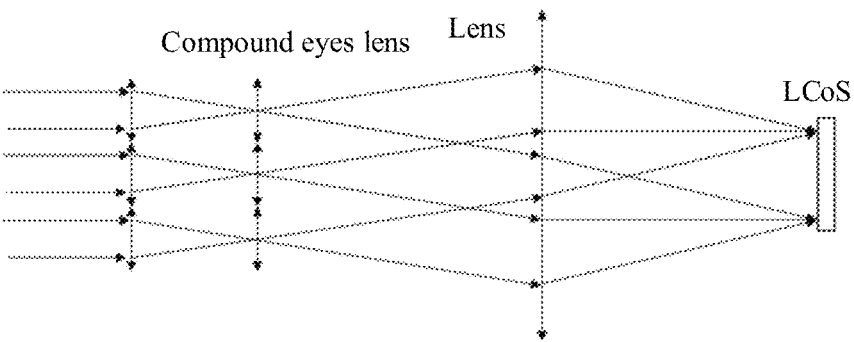
FIG. 4a is a schematic diagram of an incidence angle and a divergence angle of an LCoS panel of a picture generation apparatus without an adjustable aperture stop.
Figure 4B:
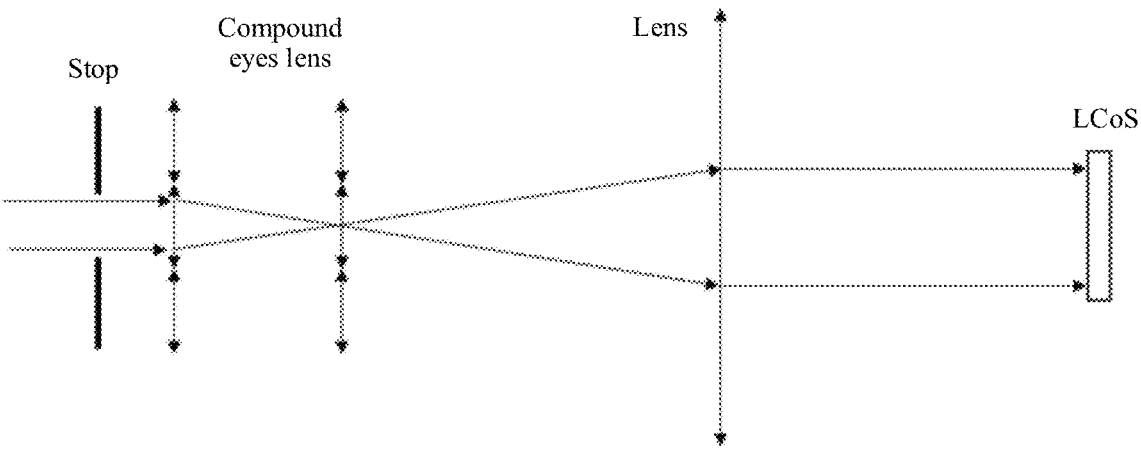
FIG. 4b is a schematic diagram of an incidence angle and a divergence angle of an LCoS panel of a picture generation apparatus with an adjustable aperture stop.

For example, as shown in FIG. 4a and FIG. 4b, when an adjustable aperture stop 21 limits the light amount of the first beam to become smaller, an incidence angle and a divergence angle of a beam on a surface of the LCoS panel are reduced, thereby improving contrast of beam modulation. When environment brightness is reduced, display brightness of the projected picture is reduced, and a high contrast requirement caused by improvement of human eyes sensitivity in a low brightness environment is met.

An effective display area of the LCoS panel is generally rectangular, and a common ratio is 16:9. This enables the divergence angle of the beam on the LCoS surface to be generally larger in a short side direction.

Figure 5:
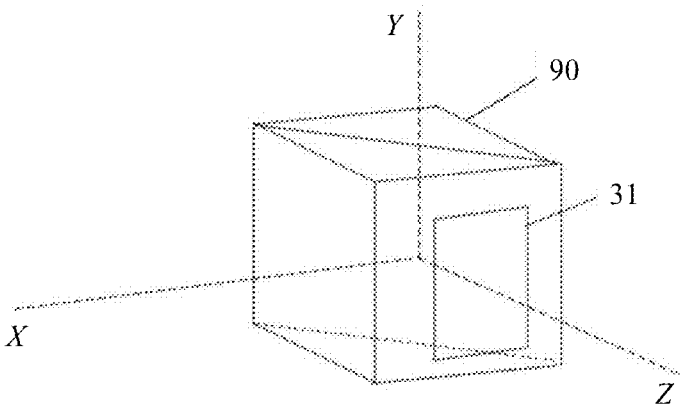
FIG. 5 is an LCoS panel deployment diagram of another picture generation apparatus according to an embodiment of this application.

Therefore, to further increase the contrast of the projected picture, in an example, as shown in FIG. 5, an LCoS panel 31 is a rectangular LCoS panel, and an extension direction of a short side of the rectangular LCoS panel is disposed parallel to an incident surface. The incident surface is a surface determined by an incident beam and a reflected beam of the polarization beamsplitter element 90, that is, an XZ plane in FIG. 5.

Figure 6A:
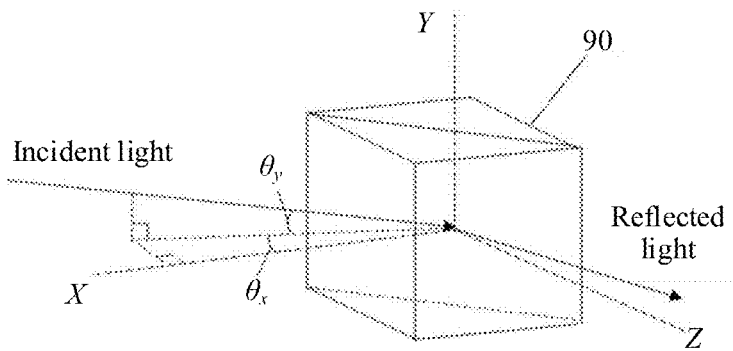
FIG. 6a is a schematic diagram of an optical path of incident light and reflected light that are deflected and incident onto a polarization beamsplitter element.
Figure 6B:
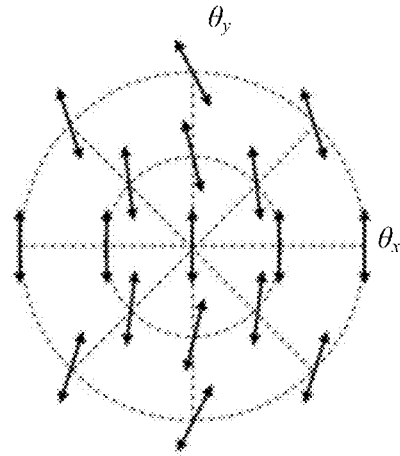
FIG. 6b is a schematic diagram of impact on a polarization state of a beam when the beam is deflected and incident onto a polarization beamsplitter element in an X direction and a Y direction.

FIG. 6a and FIG. 6b show a principle that a beam angle affects contrast. It can be found that deflection of incident light in a Y direction causes greater impact on a polarized state rotation of reflected light. More polarization state rotations indicate lower contrast, and deflection in an X direction has no impact on the polarization state rotation. Therefore, if an extension direction of a short side of an LCoS panel with a larger divergence angle is parallel to an incident surface, impact of the polarization state rotation on contrast of a picture generated by the picture generation apparatus can be reduced.

A light source assembly includes at least one light emitting element to generate a green beam, a blue beam, and a red beam, and a light combining assembly, which is disposed on transmission paths of the beams to mix the beams into a first beam for emission.

The light emitting element may be a light emitting element such as a laser or a light emitting diode (LED).

For example, in FIG. 3, the light emitting element includes at least the LED 11 for generating a red beam, the LED 12 for generating a green beam, the LED 13 for generating a first blue beam, and the LED 14 for generating a second blue beam. The light combining assembly includes at least a first dichroic mirror element 15 and a second dichroic mirror element 16, the first dichroic mirror element 15 is disposed on transmission paths of the green beam, the first blue beam, and the second blue beam, to reflect the first blue beam to the green light LED 12, and transmit the green beam and reflect the second blue beam onto a transmission path of the green beam to form a mixed beam. The second dichroic mirror element 16 is disposed on transmission paths of the red beam and the mixed beam, and is configured to transmit the mixed beam and reflect the red beam to form the first beam on the transmission path of the mixed beam.

A dichroic mirror that can reflect the blue beam and transmit a beam with another color is selected as the first dichroic mirror element 15, and a dichroic mirror that can reflect the red beam and transmit a beam with another color is selected as the second dichroic mirror 16.

In this embodiment of this application, the LED 12 uses a Blu-ray chip to excite a phosphor on a surface to generate green light. Through reflection by the first dichroic mirror, the LED 13 implements incidence to the LED 12, to excite the phosphor on the surface of the LED 12 chip again to generate the green light, thereby enhancing intensity of the green light and increasing a display effect of the projected picture.

In another example, as shown in FIG. 3, the light combining assembly further includes a collimation lens element 17. The second collimation lens element 17 is disposed on the transmission path of the mixed beam and is configured to collimate the mixed beam to the second dichroic mirror element 16.

Certainly, a structure of the light source assembly in FIG. 3 is merely an implementation example, and the light source assembly may further have another possible implementation. For example, the light source assembly includes a first light emitting element, a second light emitting element, a third light emitting element, and the light combining assembly. The first light emitting element, the second light emitting element, and the third light emitting element are respectively configured to provide the red beam, the green beam, and the blue beam, and the light combining assembly is disposed on transmission paths of the red beam, the green beam, and the blue beam, and the beams are mixed into the first beam for emission. For example, the light combining assembly is a dichroic mirror that may reflect a beam with one color, and transmit a beam with another color. The red beam, the green beam, and the blue beam are mixed to form the first beam through proper selection of a proper dichroic mirror and arrangement.

The LCoS synchronously modulates an RGB picture separately by lighting up LEDs that provide the red beam, the blue beam, and the green beam in a time sequence, and generates a colored pattern by utilizing a persistence effect of human eyes vision.

The lens assembly 40 may, for example, include a combination of one or more optical lenses with a diopter. The optical lenses include, for example, non-planar lenses such as a biconcave lens, a biconvex lens, a concave-convex lens, a convex-concave lens, a plano-concave lens, a plano-convex lens, or various combinations thereof. A model and a type of the lens assembly are not limited in this embodiment of this application.

In another example, the spatial light modulation assembly 30 may alternatively be a DMD. For example, the spatial light modulation assembly 30 includes a DMD panel 32. The following describes an optical path structure of a picture generation apparatus in a case in which the spatial modulation assembly is a DMD.

Figure 7:
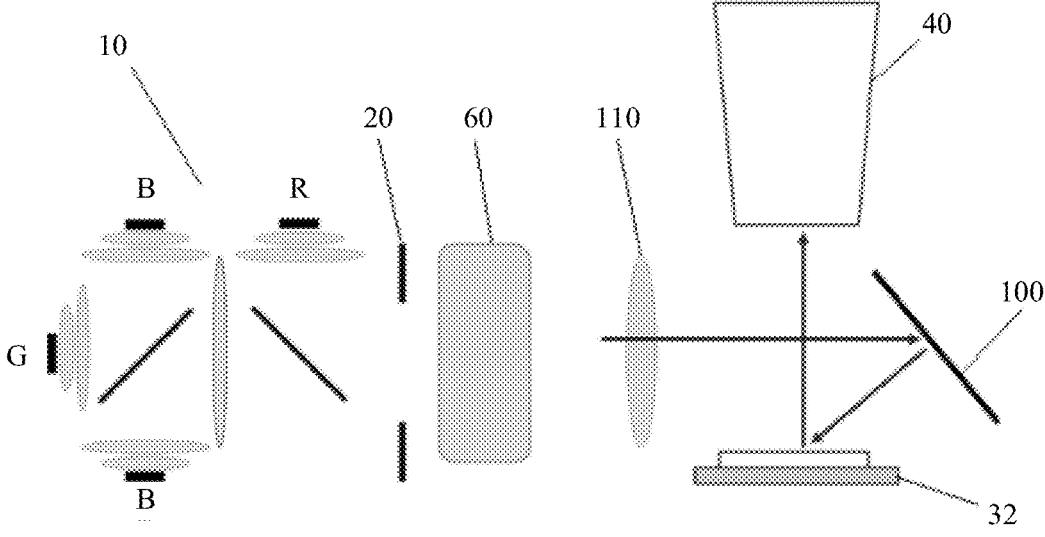
FIG. 7 is a schematic diagram of a structure of another picture generation apparatus according to an embodiment of this application.

FIG. 7 is a schematic diagram of a structure of another picture generation apparatus according to an embodiment of this application. As shown in FIG. 7, the picture generation apparatus includes at least a light source assembly 10, a beam adjustment assembly 20, a light homogenizing assembly 60, a reflector element 100, a DMD panel 32, and a lens assembly 40.

For structures and configurations of the light source assembly 10, the beam adjustment assembly 20, and the light homogenizing assembly 60, refer to the foregoing descriptions. The reflector element 100 is disposed on an optical path behind the light homogenizing assembly 60 to reflect a beam to the DMD panel 32, and the DMD panel 32 modulates the beam to generate a picture beam. The lens assembly 40 projects the picture beam onto a projection surface to form a projected picture.

In an example, a collimation lens element 11o is further disposed between the light homogenizing assembly 60 and the reflector element 100, and collimates the beam onto the reflector.

An embodiment of this application further provides a projection apparatus. The projection apparatus includes the foregoing picture generation apparatus and an ambient brightness sensor. The ambient brightness sensor is configured to detect brightness of an environment in which a projection surface is located. The picture generation apparatus is in communication connection with the ambient brightness sensor. The picture generation apparatus adjusts brightness of a projected picture (that is, a target picture) based on the brightness that is of the environment in which the projection surface is located and that is detected by the ambient brightness sensor.

For example, the ambient brightness sensor may be a light intensity sensor, and the light intensity sensor determines environment brightness by detecting intensity of external light.

The ambient brightness sensor is in communication connection with a control element. The control element controls a size of a light transmission hole of an adjustable aperture stop element based on the brightness of the environment in which the projection surface is located, to adjust the brightness of the projected picture.

For example, the light intensity sensor detects light intensity of the environment in which the projection surface is located, and then sends detected light intensity information to a control element of a picture generation unit. The control element controls the size of the light transmission hole of the adjustable aperture stop element based on the received brightness of the environment in which the projection surface is located. The contrast of the projected picture is adjusted while the brightness of the projected picture is adjusted at the same time.

An example in which the projection apparatus is used in a conference room scenario is used for description. If the projection apparatus is a conference projector, the projection surface is a wall surface or a projection screen surface in the conference room, and the environment brightness of the projection surface is the environment brightness of the conference room. When the conference room environment becomes dark, a PGU in the projector adjusts a light transmission hole of an adjustable aperture stop element to become smaller, and adjusts brightness of a projected picture to become lower and contrast to become higher, so that viewing experience of a user in a dark light environment is improved. When the conference room environment becomes bright, the PGU in the projector adjusts the light transmission hole of the adjustable aperture stop element to become larger, and adjusts the brightness of the projected picture to become higher, to adapt to viewing by the user in a bright light environment.

It should be noted that the projection apparatus provided in this embodiment of this application may be a plurality of types of projection apparatuses, for example, a home projector, a cinema projector, or an in-vehicle HUD. The type of the projection apparatus is not limited in this embodiment of this application.

An embodiment of this application further provides a vehicle. The vehicle includes the foregoing projection apparatus or picture generation apparatus.

Vehicles include but are not limited to transportation means such as an electric vehicle, a fuel vehicle, an engineering vehicle, an agricultural vehicle, an aircraft, and a ship. The projection apparatus is an in-vehicle HUD, and the in-vehicle HUD is in communication connection with an advanced driving assistant system (ADAS) of the vehicle. The HUD receives driving assistant information input by the ADAS, for example, information such as a vehicle speed and navigation, and then generates a picture by using the PGU. The picture is then projected onto a windshield to form a real image, or a magnified virtual image observable by human eyes is formed in front of a car through a curved reflector and a windshield, and is used as a driving reference for a driver.

The in-vehicle HUD includes but is not limited to in-vehicle HUDs such as a C-HUD, a W-HUD, and an AR-HUD.

The C-HUD is an early HUD, C is an initial letter of Combiner, and Combiner is an optical lens that transmits and reflects a beam. An instrument information picture displayed by the PGU is projected to Combiner through a reflector (or there may be no reflector) and finally reflected to human eyes, forming a virtual image in front of the human eyes. The C-HUD is a separate device placed above a steering wheel or center console, and therefore is also referred to as a rear-mounted HUD. The C-HUD has a small field of view and displays simple information, but the C-HUD is neither beautiful nor safe to be placed in front of a driver.

Figure 8:
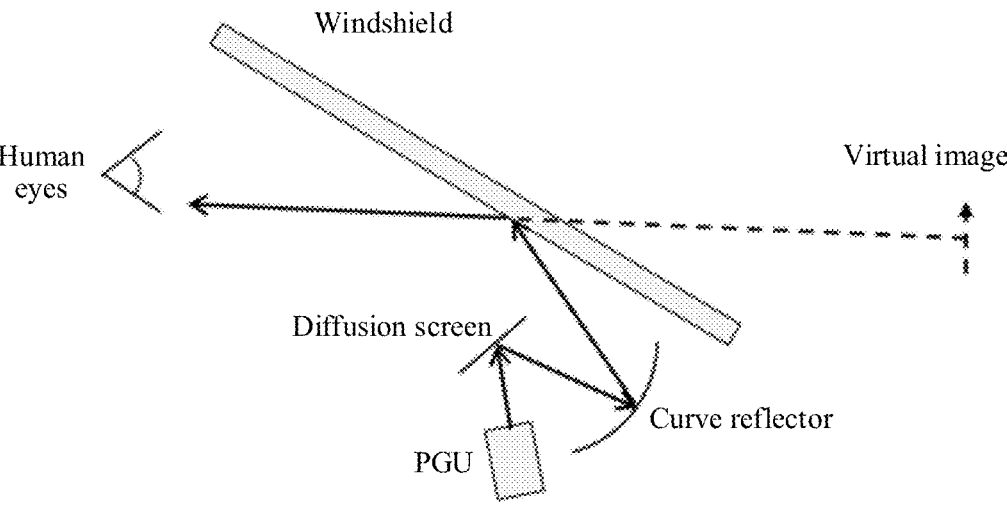
FIG. 8 is a schematic diagram of a scenario in which a W-HUD is deployed in a vehicle according to an embodiment of this application.

For the W-HUD, W is an initial letter of the word Windshield, and when the W-HUD is used in the vehicle, as shown in FIG. 8, it is different from the C-HUD that, a picture generated by the PGU is projected onto the windshield and reflected to the human eyes, forming a virtual image in front of the car. The W-HUD is also referred to as a front-mounted HUD because the W-HUD is integrated with the body of the car. Compared with the C-HUD, the W-HUD can have a larger field of view, can display more information, and is integrated with the body of the car, and therefore the W-HUD is safer and more beautiful. With development of automobile technologies and introduction of more application scenarios, a development trend of the HUD is an augmented reality AR-HUD. The AR-HUD is a technology that superposes and displays virtual information such as navigation on a road or another external object, and can display richer information and provide better driving experience and application scenarios. A technical solution of the AR-HUD is the same as that of the W-HUD. A difference lies in that a virtual image distance (a distance from a virtual image to human eyes) ranges from 2 m to 3 m for the W-HUD, and is generally greater than 5 m for the AR-HUD. A larger virtual image distance allows for a better combination of the virtual and the real, and in addition, the AR-HUD has a larger field of view to enhance augmented reality experience. A virtual image displayed by the AR-HUD needs to be combined with a real scene, and requires precise positioning and detection of the vehicle, and therefore the AR-HUD needs to cooperate with an ADAS system of the car.

The information displayed on the AR-HUD is superposed on the road and the object in front of the car. Ideally, when the PGU displays black, no light should be projected from the HUD, and the driver can see only real object information in front of the car. However, the PGU cannot completely project no light, in other words, cannot completely display pure black. As a result, the driver sees a "light window" in front of the car, and this affects experience of AR presentation. To reduce an effect of the "light window", display contrast of the PGU needs to be increased, to reduce, as much as possible, light that is output when a black signal is displayed. In particular, the human eyes are more sensitive in a dark environment and this requires higher contrast. The PGU provided in this embodiment and the in-vehicle AR-HUD in which the PUG is used can reduce display brightness of the HUD in the dark environment, and can also increase display contrast of the HUD, reduce or eliminate the effect of the "light window", and improve user experience.

In descriptions of this specification, specific features, structures, materials, or characteristics may be combined in a proper manner in any one or more embodiments or examples.

The final note is: The foregoing embodiments are merely used to describe and limit the technical solutions of this application. Although this application is described in detail with reference to the foregoing embodiments, a person of ordinary skill in the art should understand that: The person of ordinary skill may still modify the technical solutions set forth in the foregoing embodiments, or equivalently replace some technical features of the technical solutions. However, the modifications or replacements do not cause the essence of the corresponding technical solutions to depart from the scope of the technical solutions in embodiments of this application.

What is claimed is:

1. A picture generation apparatus comprising:
   a light source assembly configured to generate a light beam;
   a spatial light modulation assembly configured to modulate the light beam to generate a picture beam;
   a lens assembly configured to project the picture beam onto a projection surface to display a target picture;
   a light homogenizing assembly disposed on a first optical path between the light source assembly and the spatial light modulation assembly and configured to perform light homogenization on the light beam generated by the light source assembly; and
   a beam adjustment assembly disposed on a second or third optical path, and configured to adjust a light amount of the light beam to adjust brightness of the target picture,
      wherein the second optical path is between the light source assembly and the light homogenizing assembly, and
      wherein the third optical path is between the light homogenizing assembly and the spatial light modulation assembly.

2. The picture generation apparatus according to claim 1, wherein the beam adjustment assembly comprises a control element and an adjustable aperture stop element, and the control element controls a size of a light transmission hole of the adjustable aperture stop element to adjust the light amount of the light beam.

3. The picture generation apparatus according to claim 2, wherein the light transmission hole of the adjustable aperture stop element is a circular light transmission hole or a rectangular light transmission hole.

4. The picture generation apparatus according to claim 1, wherein the light homogenizing assembly is a compound eyes lens.

5. The picture generation apparatus according to claim 1, wherein the spatial light modulation assembly is a reflective spatial light modulation assembly.

6. The picture generation apparatus according to claim 5, wherein the reflective spatial light modulation assembly is a liquid crystal on silicon (LCOS) assembly, and the picture generation apparatus further comprises:
   a polarization beamsplitter element disposed on a fourth optical path between the light source assembly and the LCOS assembly, and configured to reflect a second beam of S-polarized light to the LCOS assembly, and transmit a third beam of P-polarized light to the lens assembly.

7. The picture generation apparatus according to claim 6, wherein the picture generation apparatus further comprises:
   a polarized light conversion element disposed on a fifth optical path between the light source assembly and the polarization beamsplitter element, and configured to modulate the light beam into the second beam of the S-polarized light.

8. The picture generation apparatus according to claim 5, wherein the reflective spatial light modulation assembly is a digital micromirror display (DMD) assembly, and the picture generation apparatus further comprises:
   a first collimation lens element disposed between the light source assembly and the DMD assembly, and configured to collimate the light beam; and
   a reflector element disposed between the first collimation lens element and the DMD assembly, and configured to reflect, to the DMD assembly, a beam collimated by the first collimation lens element.

9. The picture generation apparatus according to claim 6, wherein the LCOS assembly comprises a rectangular LCOS panel; and an extension direction of a short side of the rectangular LCOS panel is parallel to an incident surface, and the incident surface is a plane determined by an incident beam and a reflected beam of the polarization beam-splitter element.

10. The picture generation apparatus according to claim 1, wherein the light source assembly comprises:

a red light emitting diode (LED) element configured to generate a red beam;

a green LED element configured to generate a green beam;

a first blue LED element configured to generate a first blue beam;

a second blue LED element disposed opposite to the first blue LED element to generate a second blue beam;

a first dichroic mirror element disposed on a first transmission path of the green beam, a second transmission path of the first blue beam, and a third transmission path of the second blue beam, and configured to reflect the first blue beam to the green LED element, and transmit the green beam and reflect the second blue beam onto the first transmission path of the green beam to form a mixed beam; and a second dichroic mirror element disposed on a fourth transmission path of the red beam and a fifth transmission path of the mixed beam, and configured to transmit the mixed beam, and reflect the red beam onto the fifth transmission path of the mixed beam to form the first beam.

11. The picture generation apparatus according to claim 10, wherein the light source assembly further comprises:

a second collimation lens element disposed on the fifth transmission path of the mixed beam, and configured to collimate the mixed beam to the second dichroic mirror element.

12. The picture generation apparatus according to claim 1, wherein the beam adjustment assembly comprises:

a controllably adjustable aperture stop configured to vary an aperture size to actively control an amount of light supplied toward the spatial light modulation assembly, wherein adjustment of brightness of the target picture is performed by varying the aperture size without varying a brightness of the light beam generated by the light source assembly.

13. A vehicle comprising:

a picture generation apparatus comprising:

a light source assembly configured to generate a light beam;

a spatial light modulation assembly configured to modulate the light beam to generate a picture beam;

a lens assembly configured to project the picture beam onto a projection surface to display a target picture;

a light homogenizing assembly disposed on a first optical path between the light source assembly and the spatial light modulation assembly and configured to perform light homogenization on the light beam generated by the light source assembly; and a beam adjustment assembly disposed on a second or third optical path, and configured to adjust a light amount of the light beam to adjust brightness of the target picture, wherein the second optical path is between the light source assembly and the light homogenizing assembly, and wherein the third optical path is between the light homogenizing assembly and the spatial light modulation assembly.

14. The vehicle according to claim 13, wherein the beam adjustment assembly comprises a control element and an adjustable aperture stop element, and the control element controls a size of a light transmission hole of the adjustable aperture stop element to adjust the light amount of the light beam.

15. The vehicle according to claim 14, wherein the light transmission hole of the adjustable aperture stop element is a circular light transmission hole or a rectangular light transmission hole.

16. A method for generating a picture, the method comprising:

modulating a light beam to generate a picture beam;

projecting the picture beam onto a projection surface to display a target picture;

adjusting a light amount in a first or a second optical path of the light beam to adjust brightness of the target picture, wherein the first optical path is between a light source assembly and a light homogenizing assembly, and wherein the second optical path is between a light homogenizing assembly and a spatial light modulation assembly;

detecting brightness of an environment in which the projection surface is located; and using the detected brightness of the environment in adjusting the light amount in the first or the second optical path of the light beam.

17. The method according to claim 16, wherein the method further includes controlling a size of a light transmission hole of an adjustable aperture stop element to adjust the light amount of the light beam.

18. The method according to claim 17, wherein controlling a size of a light transmission hole of the adjustable aperture stop element is based on the brightness of the environment in which the projection surface is located to adjust the brightness of the target picture.

19. The method according to claim 17, wherein the light transmission hole of the adjustable aperture stop element is a circular light transmission hole or a rectangular light transmission hole.

20. The method according to claim 16, wherein the method includes performing light homogenization on the light beam.

\* \* \* \* \*